United States Patent Office

3,595,697
Patented July 27, 1971

3,595,697
HERMETICALLY SEALED ELECTRIC BATTERY COMPRISING HERMETICALLY SEALED ELECTROCHEMICAL CONTROL CELL
Siegfried Dickfeldt, Hagen, Lutz Horn, Erlangen, and Freimut Peters, Hagen, Germany, assignors to Varta Aktiengesellschaft, Frankfurt am Main, Germany
Continuation of application Ser. No. 645,301, June 12, 1967. This application Apr. 30, 1970, Ser. No. 31,844
Claims priority, application Germany, June 15, 1966, V 31,253
Int. Cl. H01m 35/00, 43/04
U.S. Cl. 136—6                             10 Claims

ABSTRACT OF THE DISCLOSURE

An electrochemical control device for use particularly in connection with storage batteries is formed of at least one hermetically sealed cell in which positive and negative electrodes are arranged including identical active mass so that the electrodes are of potentially changeable opposite polarity, whereby at the time of starting operation, the amount of reduceable material in the active mass of the electrode serving as cathode, measured in electrochemical equivalents, is greater than the amount of oxidizable material in the active mass of the electrode serving as anode, and wherein up to 40% of the combined amount of the active masses of the cathode and the anode, measured in electrochemical equivalents, is in reduced condition.

---

This application is a continuation of our co-pending application Ser. No. 645,301 filed June 12, 1967, now abandoned.

BACKGROUND OF THE INVENTION

The present invention is concerned with a hermetically sealed electrochemical control device which consists of at least one hermetically sealed electric cell. The control device serves for the timely control of a great variety of operations, particulary those including the flow of electric current, such as limiting or controlling the charging or discharging of storage batteries or cells. Some of these operations are described in U.S. Pat. No. 3,023,258 in connection with the device disclosed therein.

It has been proposed to utilize for measuring and control purposes the electrochemical principle according to which the chemical changes which occur by the passage of an electric current through a galvanic element are proportional to the product of current intensity or amperage times time.

One of the major disadvantages of galvanic elements which up to now were used for control purposes is found in the fact that even when using reversible cells for carrying out the controlling function, it is not possible to use these cells so that current could flow through the same in both directions, since the reactions or processes do not require in both directions the same amount of current. Even by current flow in one direction only changes occur over prolonged periods of time so that the required accuracy of the control function is achieved only for relatively short periods.

The present invention proposes to provide an electrochemical control device on the basis of a hermetically sealed alkaline cell which is not subject to these disadvantages and which will operate substantially without maintenance. Furthermore, the control device of the present invention is to be so constructed that it will operate effectively irrespective of the direction of flow of the electric current through the device so that, for instance when using the device in connection with a storage battery, it is possible to control discharge as well as charging of the storage battery without reversing the terminal connections of the electrodes (this is sometimes called bi-functional operation).

It has already been proposed, for instance according to the above mentioned U.S. Pat. 3,023,258, to use for control purposes alkaline cells which include active cadmium mass as the active mass of both electrodes of opposite polarity. At the beginning of the charging operation, one electrode includes active mass consisting of cadmium hydroxide and the other electrode includes active mass consisting of cadmium. During charging, the cadmium hydroxide is converted into cadmium, and the cadmium of the other electrode is converted into cadmium hydroxide.

Such a control cell is arranged in series with a storage cell or storage battery. The length of time of the electrochemical conversion in the control cell which is interposed for instance between a source of electric current and the storage battery, which length of time is determined by a preceding treatment of the control cell with reversed polarity, will determine the length of time of the charging of the storage battery, since after complete conversion of the active mass of the control cell to cadmium and cadmium hydroxide, respectively, the voltage at the electrodes of the control cell will rise substantially due to oxygen and hydrogen development. By arringing the control cell in series with a storage battery which may be charged at a constant voltage, due to such increase in the voltage and consequent reduction of the total voltage available for charging of the battery, the charging current will be greatly reduced. During discharge, these conditions are reversed so that again due to the voltage increase connected with hydrogen and oxygen development at the terminals of the control cell which is interposed between the storage battery and the consumer, the discharge current at the storage battery will be strongly reduced.

However, it is a disadvantage of this arrangement that due to decomposition of the electrolyte and gas formation in the control cell, maintenance of the control cell is required, particularly to replenish the electrolyte water, so that control cells of this type cannot be used as constituents of electric circuits. Furthermore, substantial miniaturization of such control cells is not possible.

According to one specific embodiment related to the above suggestion, the cells are so arranged that initially one electrode plate contains exclusively reduced active material whereas the other plate contains the same amount of oxidized material together with an excess of between 5 and 10% of reduced material. Throughout the present specification, amounts of reduceable, reduced, oxidizable or oxidized material of the active mass are indicated and compared in electrochemical equivalents. The last described cell may be hermetically sealed and used in combination with hermetically sealed storage batteries at space conditions. However, it is a disadvantage of the last mentioned arrangement that it does not include means which upon prolonged passage of current through the control cell in one or the other direction will prevent harmful hydrogen gas development. Such hydrogen gas development must be prevented in the case of hermetically sealed cells.

It is an object of the present invention to provide a device for controlling on the basis of electrochemical reactions the period of time of certain electrical processes such as the charging and discharging of storage batteries without experiencing the difficulties and disadvantages which for instance are caused by the maintenance requirements of open cells or by the impossibility of eliminating hydrogen in the case of hermetically sealed control cells, particularly the hydrogen development which occurs upon exhaustion of the reduceability of the initially oxidized electrode.

SUMMARY OF THE INVENTION

It is proposed according to the present invention to provide a control device utilizing electrochemical reactions for controlling for instance the length of time of certain processes such as charging or discharging of a storage battery which control device can be of very small size and does not require maintenance. The control device of the present invention comprises at least one hermetically sealed cell including cathode means and anode means whereby the cathode and anode means, respectively, include identical active mass, and wherein at the time of starting operation of the control device, the amount of reduceable material in the active mass of the cathode means, measured in electrochemical equivalents, is greater than the amount of oxidizable material in the active mass of the anode means, and wherein of the combined amount of the active masses of the cathode and anode means up to 40%, again measured in electrochemical equivalents, is in reduced condition.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

For solving the above described problems, the present invention proposes a modification of conventional polarizing cells, such as the current smoothing or stabilizing cells disclosed in the above mentioned U.S. patent.

These conventional control cells contain for instance cadmium mass in the electrodes of opposite polarity and are hermetically sealed with both electrodes in oxidized condition. The electrodes of these cells are of potentially changeable opposite polarity. Upon connecting such cells to a source of direct current, the terminal voltage rises, after a short period of time, quickly to a value of between 1.4 and 1.5 volts.

Such cells cannot be used for the time control of current flow which is to be accomplished with the control device of the present invention, due to the fact that the period of time during which the terminal voltage of the cell remains low, due to sluggish polarization of the electrodes, is very short and amounts only to between a fraction of a second and several seconds.

According to the present invention, such cell is so arranged that upon starting operation of the cell the active mass of the electrode serving as cathode contains, expressed in electrochemical equivalents, more reduceable material than the amount of oxidizable material in the active mass of the electrode serving as anode and, furthermore, of the combined amount of active mass of the electrodes of opposite polarity no more than 40% again expressed in electrochemical equivalents, is in reduceable condition.

Consequently, at all times, the active mass of the electrode serving as cathode will contain a larger amount of reduceable material than the oxidizable amount contained in the active mass of the electrode serving as anode.

A cell including in the electrodes of opposite polarity active mass conforming to the above described conditions may be closed in any of the charge conditions described below. The only further requirement will be that the active mass of the electrode serving as cathode will not contain more than about 80% reduceable material. The remaining about 20% of the active mass of the cathode serve as the so-called "charge reserve" for preventing the development of hydrogen. It follows that the proportion of reduced material in the combined active masses of the electrodes of opposite polarity should not exceed 40%.

Figure 1:
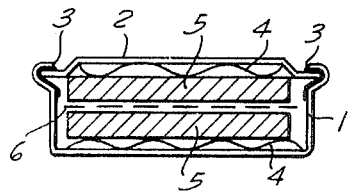
FIG. 1 is a schematic cross-sectional view of a control device according to the present invention in the form of a so-called button cell.

Referring now to the drawing and particularly to FIG. 1, the control cell according to the present invention is illustrated in the form of a so-called button cell.

The cell of FIG. 1 includes a thin separator sheet 6 interposed between electrodes 5. The alkaline electrolyte of conventional composition, for instance an aqueous potassium hydroxide solution having a density of between about 1.20 and 1.25, is predominantly absorbed in the pores of the electrodes and the separator. Between the housing 1 and the electrode separator arrangement gas-collecting spaces will be formed limited in part by the free faces of the electrodes. One terminal (not shown) will be connected to housing 1 which, in turn, is electrically connected to the lower electrode by means of interposed undulating spring 4. The other terminal (also not shown) will be connected to cover 2 and cover 2, due to interposition of upper undulating spring 4 is in electric contact with the upper electrode 5. Housing 1 and cover 2 are separated from each other by insulating sealing material 3.

Figure 2:
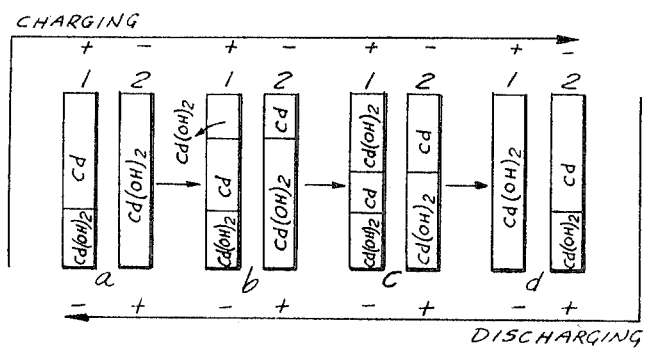
FIG. 2 illustrates schematically the charge conditions under hermetically sealed conditions which apply for instance to the cell of FIG. 1.

FIG. 2 illustrates schematically the charge conditions in the hermetically sealed cell illustrated in FIG. 1.

The portion a of FIG. 2 illustrates the condition of the electrodes at the time of hermetically sealing the same. It will be seen that two-thirds of electrode 1 are reduced, whereas electrode 2 is completely oxidized. If, however, a source of current is connected to the cell as indicated by the "charge" line, so that electrode 1 becomes the anode and electrode 2 the cathode, then, progressively, as indicated at b, c, and d, the metallic cadmium of electrode 1 will be completely oxidized and the oxidized mass of electrode 2 will be reduced to the same extent, expressed in electrochemical equivalents, as cadmium in electrode 1 is oxidized. Thus, one-third of the active mass of electrode 2 remains in oxidized condition and serves as charge reserve in order to prevent hydrogen gas formation. If now the electrode 2 is made the anode and electrode 1 the cathode as indicated by the line "discharge," the reaction proceeds in opposite direction from $d$ towards $a$.

Figure 3:
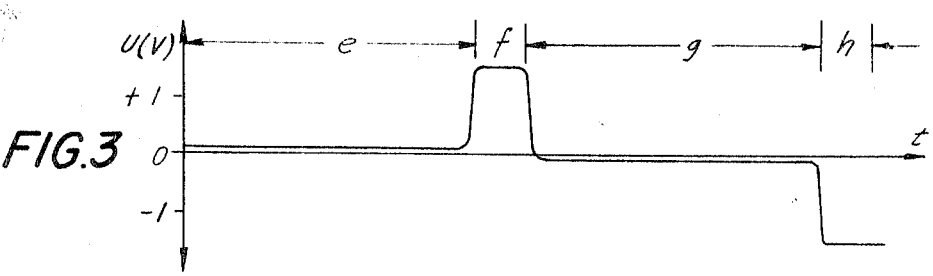
FIG. 3 illustrates the voltage curve in the cell during passage of current therethrough in opposite directions.

FIG. 3 illustrates the voltage in both directions, i.e., during "charge" and "discharge" as shown in FIG. 2.

During the time periods $e$ and $g$ the voltage between the electrodes will be the difference between the potentials of reactions (1) and (2):

(1) anodic $Cd \rightarrow Cd(OH)_2$ (2) cathodic $Cd(OH)_2 \rightarrow Cd$

During the time periods $f$ and $h$ the voltage will correspond to the potential differences between reactions (3) and (4):

(3) anodic development of $O_2$
(4) cathodic reduction of $O_2$

This is due to the fact that upon complete oxidization of one or the other electrode, further anodic polarization will cause oxygen development at the completely oxidized electrode, which oxygen will be reduced at the electrode of opposite polarity. At the transition from $e$ to $f$ and from $g$ to $h$ there will be a sudden increase in the terminal voltage of the cell.

Figure 4:
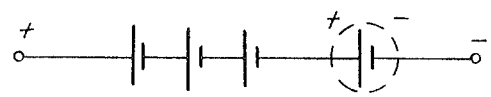
FIG. 4 is a schematic illustration for the purpose of showing that the control cell of the present invention operates reversibly or bi-functionally.

FIG. 4 will serve to show that the control cell of the present invention may be reversibly operated and thus fulfill the requirement of being a bi-functional cell. In other words, the voltage and time characteristics during charging are identical with those during discharge of the cell but of course in opposite sequence.

The operation of a control cell according to the present invention such as the one described and illustrated hereinabove may be described as follows:

For the purpose of the present example, it is assumed that the control cell is intended to control the charging or discharging of a storage battery or a series of storage batteries of sealed alkaline cells or a series of such cells. The control device may be a single hermetically sealed alkaline control cell according to the present invention, or a battery consisting of a plurality of such control cells.

By arranging the control cell in series with the storage battery so that electrode 1 of FIG. 2 of the control cell, including partially oxidized mass, is connected to the negative electrode of the storage battery and electrode 2 of FIG. 2 is connected to the negative terminal of the charging device while the positive terminal of the battery is connected to the positive terminal of the charging device, as illustrated in FIG. 4 upon passage of current through the control cell, oxidized mass of electrode 2 thereof will be reduced, and reduced mass of electrode 1 will be oxidized. These processes proceed in the direction of the arrow "charge" in FIG. 2. Thereby, first a low potential of between 50 and 100 mv. will be formed, depending on the charge conditions at the terminals of the control cell. As long as the terminal voltage of the control cell remains within this low range, and assuming that the charging voltage remains constant, a practically undiminished charging current will pass through the battery. Upon continuing charging for a prolonged period of time, a charge condition of the control cell corresponding about to the conditions $b$ of FIG. 2 will be reached, i.e., oxidizing of the active mass of electrode 1 will be continued and equivalent reduction of the active mass of electrode 2 will take place.

In the next phase, i.e., upon continuing charging, a larger proportion of the active mass of electrode 1 is oxidized and a corresponding larger proportion of the active mass of electrode 2 is reduced, corresponding to the conditions illustrated in FIG. 2c. When finally the residual oxidizable mass of electrode 1 is oxidized and an equivalent portion of the active mass of electrode 2 is reduced, as illustrated in FIG. 2d, a sudden rise of the potential of the positive electrode 1 will take place due to a change from the potential of the reaction (5):

(5) $Cd + 2OH \rightarrow Cd(OH)_2 + e^-$ to the potential of the reaction (6):

(6) $4OH \rightarrow O_2 + 2H_2O + 4e^-$

In other words, the electrochemical reaction at positive electrode 1 will now be a different one which has a potential which is nobler by about 1.5 volts.

This quick rise of the terminal voltage influences the charging of the cells or battery arranged in series, always providing that the voltage of the charging current remains constant, since now a large portion of the total available charging voltage is required by the control cell. It follows that the residual voltage available for the storage battery which is to be charged is reduced by the substantial voltage required by the control cell and consequently, the charging current available for the storage battery is substantially reduced.

After a charge condition of the electrodes of the control cell in accordance with FIG. 2d is reached, exactly the opposite condition of FIG. 2a is achieved. The control cell is now in a condition in which it is capable of controlling an electric current flow in opposite direction to that during charging of the storage battery. For instance, the discharge of the storage battery may be controlled. The conditions in the control cell will then change as shown in FIG. 2 in the direction of the arrow "discharge." When finally the cadmium mass of electrode 2 is oxidized, the voltage will rise again so as to influence the discharge of the storage battery, namely, to substantially reduce the discharge current to a harmless, insignificant residual magnitude.

Figure 5:
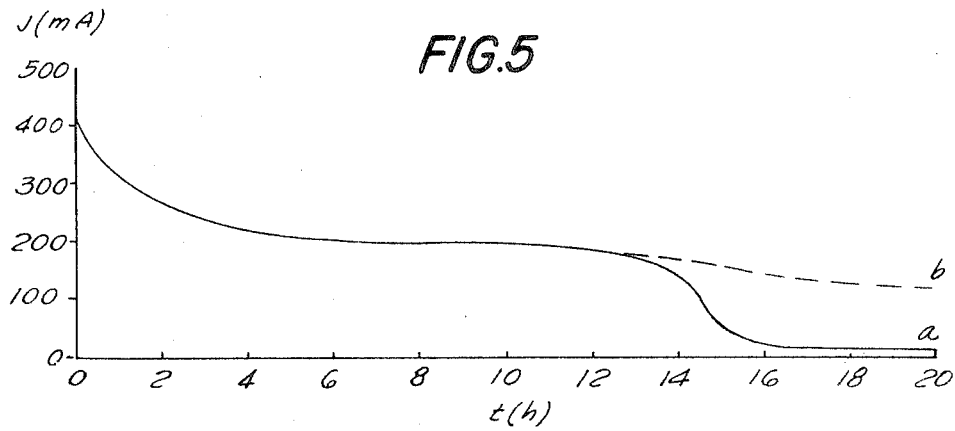
FIG. 5 is a graphic illustration of the charging current of a hermetically sealed storage battery including 5 cells upon charging with and without utilization of the control device of the present invention.

FIG. 5 is a graphic representation of the charging current during the charging of a hermetically sealed 5-cell storage battery having a capacity of 2.5 ah. Continuous line $a$ represents charging with a control cell according to the present invention interposed between the source of current and the storage battery, and the left-hand portion of the continuous line plus broken line $b$ represent the conditions upon charging under otherwise equal conditions but without interposition of the control cell. The total charging voltage is 7.7 volts. Additionally, a resistance of 2.8 ohms is arranged upstream of the storage battery. According to the example illustrated in FIG. 5, the control cell has been treated prior to being hermetically sealed so that the positive electrode 1 in the condition of FIG. 2a contains such an amount of reduced cadium mass that the same will be fully oxidized by the charging current, under the above described conditions, within a period of about 14 charging hours, so that after about 14 charging hours a sudden voltage change will occur.

When charging the storage battery in the same manner but without the interposition of the control cell, the current density or strength changes only slightly after 14 charging hours. Even after 20 charging hours, as illustrated, the charging current would still be greater than 100 ma. as shown by the broken line $b$.

On the other hand, if charging is carried out with the control cell according to the present invention interposed between downstream of the source of current, and if the control cell is adjusted to 14 hours as described above, it will be accompiished that after charging for about 14 hours, the current strength will quickly drop to between about 10–20 ma. as shown by the right-hand portion of line $a$. Thereby, the storage battery is safe-guarded against overcharging. By utilizing such an arrangement it is not absolutely necessary to provide any other switching or similar devices for cutting off the charging current.

Figure 6:
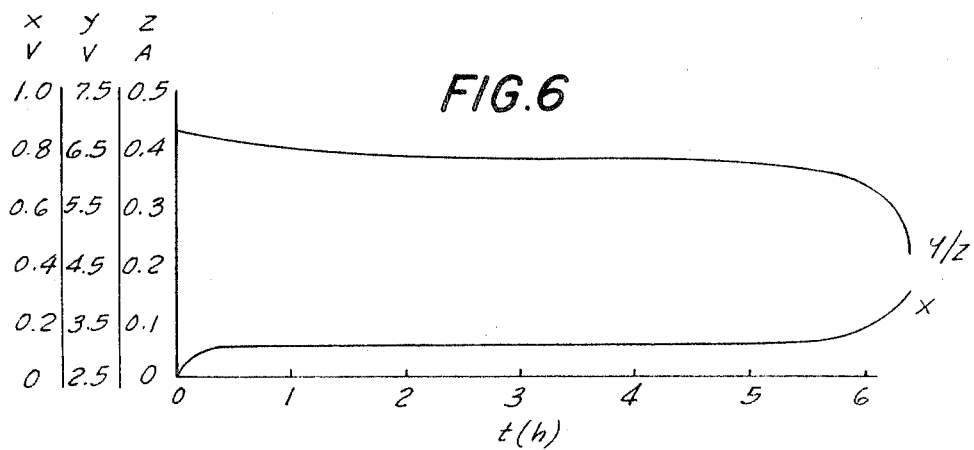
FIG. 6 illustrates in a somewhat similar manner the discharge characteristics of the 5-cell storage battery with and without utilization of the control device of the present invention.

As shown in FIG. 6, upon subsequently discharge of the storage battery with interposition of the same control cell between the storage battery and the current consumer, the characteristics with respect to voltage and current relative to discharge time are similar to those shown for the charging of the storage battery in FIG. 5.

In FIG. 6, $y$ indicates the terminal voltage of the battery, $z$ the discharge current and $x$ the voltage of the control cell during the discharge of the storage battery.

Figure 7:
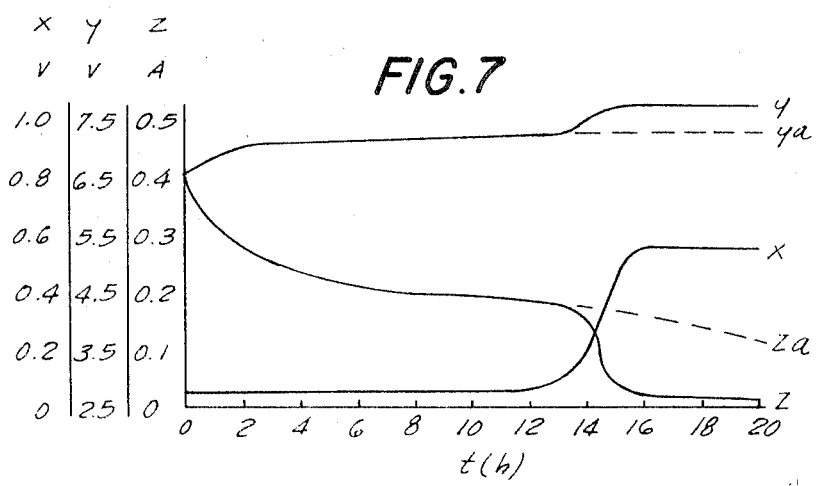
FIG. 7 illustrates for the same conditions as shown in FIG. 6 the terminal voltage of the control cell taken alone and of the storage battery and control cell.

FIG. 7 illustrates for the same conditions as described above, the charging current $z$ for the storage battery and control cell, the voltage $x$ at the terminals of the control cell and the voltage $y$ of the storage battery and control cell.

$y_a$ And $z_a$ show the curves for voltage and current under similar conditions, however, without interposition of the control cell. It can be clearly seen how the increase in voltage at the terminals of the control cell suddenly changes the voltage characteristics of the storage battery and thereby reduces the charging current. The voltage curve of the storage battery of the present example, as well as the voltage characteristics of hermetically sealed cells do not show such characteristic increase upon completion of charging and, consequently, it is not possible to utilize voltage changes within the battery for controlling the charging or discharge current.

Due to the fact that the storage battery is associated in the described manner with a control cell according to the present invention, the charging characteristics of the sealed storage battery becomes similar to the charging characteristics of a cell operated in open condition and consequently it is possible by utilizing the control cell of the present invention to employ the voltage increase for controlling the charging of the storage battery.

It is of course also possible to choose a different circuit arrangement so that the control cell will not be arranged in series but parallel to the storage battery and then to use the voltage increase of the control cell by means of suitable switching elements, known to those skilled in the art for influencing or controlling the charging or discharging of the storage battery.

Figure 8:
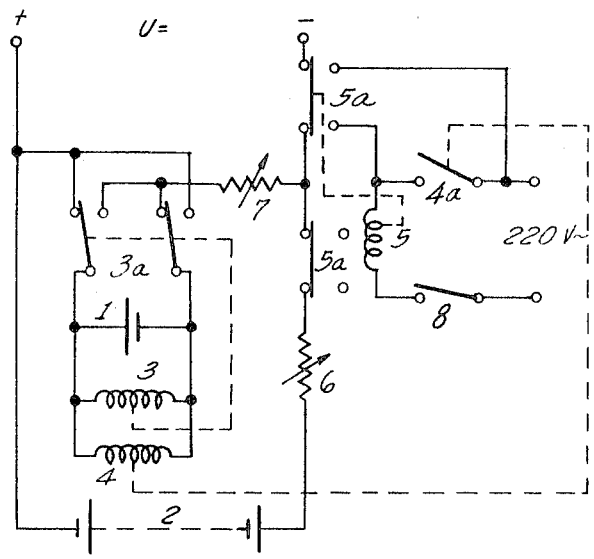
FIG. 8 shows an arrangement for the charging of a storage battery, utilizing the control device of the present invention.

Such an arrangement is illustrated in FIG. 8 and it is preferred when charging of the storage battery is carried out with constant current strength and not with constant voltage.

As seen in FIG. 8, storage battery 2 is charged from a source U of direct current, with the interposition of adjustable resistance 6. Simultaneously, current flows by way of adjustable resistance 7 and commutator switches $3a$ (with two rest positions), through control cell 1. As described above, control cell 1 has a predetermined or prearranged storage capacity corresponding to the product of current density and charging time. In other words, for short term charging, the resistor 7 is so adjusted that a high strength current will flow to the control cell, whereas for prolonged charging periods the same resistance 7 is used for adjusting a low strength current. Upon exhaustion of the storage capacity of the control cell, as shown in FIG. $3a$, a steep voltage rise will occur. Thereby the polarized relay 3 and contacts $3a$ belonging thereto will be actuated and change into their other rest position whereby the polarity of the current source is reversed. Simultaneously, relay 4 is actuated, closes contact $4a$ and thereby actuates relay 5 and contacts $5a$ thereof, whereby charging of the battery and of the control cell is interrupted. It is now possible to discharge the battery alone without the control cell within or outside the charging device. If it is desired to recharge the battery after discharge thereof, switch 8 is opened and thereby relay 5 will become currentless and contacts $5a$ thereof will revert into charging position so that now charging of control cell 1 will start in opposite direction in accordance with FIG. $3g$. After exhaustion of the storage capacity of the control cell in this opposite charge direction, the above described sudden voltage increase will take place again and this will resut in switching off of the charging of the battery by means of the relays and switching devices described above.

The storage capacity of the control cell according to the present invention, i.e., the length of time of passage of current through the cell until the sudden rise in voltage will occur, depends on the charge or discharge current. This length of time is progressively reduced with increasing charge or discharge current strength. This feature can be advantageously employed. It is known that hermetically sealed cells are very sensitive against supercharging particularly at increased current strength. The reduced storage capacity of the control cell upon increased current flow therethrough assures that the charging current will be changed at the right time so that the cells of the storage battery will not be further charged towards the end of the charging process with an undesirably high current density. Such charging with inadmissibly high current density would lead to an uncontrollable gas development.

Figure 9:
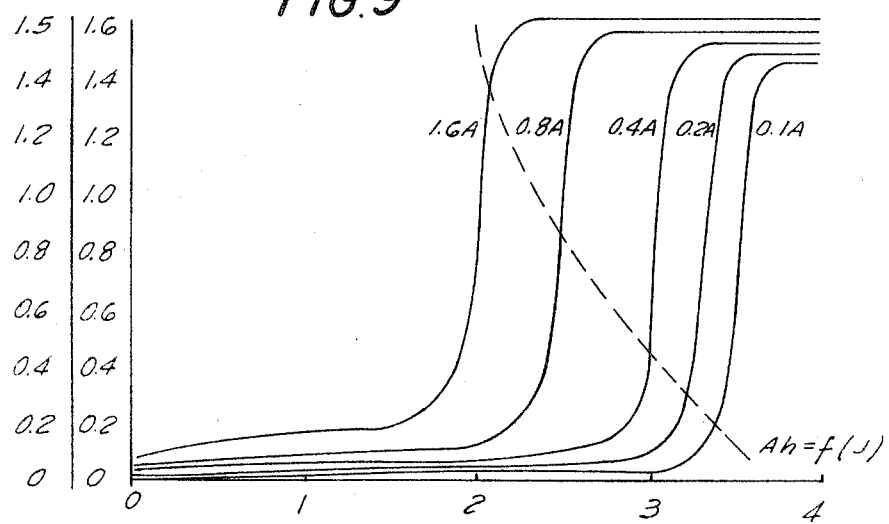
FIG. 9 is a graphic illustration of the voltage characteristics of a control cell according to the present invention and of the ability to store electric current, as a function of the current intensity.

The charge characteristics of a control cell according to the present invention and its storage capacity (broken line) are illustrated in FIG. 9 in dependence on the current strength.

When it is desired to control charging and discharging of a storage battery including a relatively large number of cells, one control cell will not suffice and generally it is desirable to provide one control cell for each group of between 5 and 10 storage cells.

It should also be mentioned that the storage capacity of the control cell must be adjusted with respect to the capacity of the storage battery which is to be controlled during charging and discharging thereof. The control cell must be sufficiently large so that the charging and discharging current of the battery may flow therethrough without causing damage. This means, that the dimensions of the control cell should be approximately the same as the dimensions of a cell of the battery, if the control cell is arranged in series with the storage battery.

If the control cell is to be arranged in parallel, as illustrated in FIG. 8, then the dimensions of the control cell may be considerably smaller than those of the cells of the storage battery.

The control cells according to the present invention may be equipped with the conventional types of electrodes known to be suitable for use in alkaline storage batteries, such as pocket electrodes, or sinter electrodes of sintered nickel powder which contain the active mass in the pores of the sintered body.

According to the examples discussed above, the active mass of the electrodes of opposite polarity is cadmium mass. However, the invention is not limited thereto, and it is also possible to use other conventional active masses instead of cadmium mass, for instance nickel hydroxide.

However, in order to make it possible to operate the control cell in hermetically sealed condition, and bifunctionally, i.e., so that the direction of current flowing through the cell may be reversed, it is desirable to include in the active masses of both electrodes a proportion of cadmium hydroxide, i.e. in an amount of 20 to 50 percent of the sum of the nickel hydroxide and the cadmium hydroxide in the electrodes. Thereby, the charge conditions of the control cell must be so adjusted prior to hermetically sealing the same that the nickel hydroxide mass and the cadmium mass of the negative electrode are in oxidized condition and the nickel hydroxide mass of the positive electrode is in reduced condition whereas the cadmium mass of the positive electrode is partially oxidized.

Figure 10:
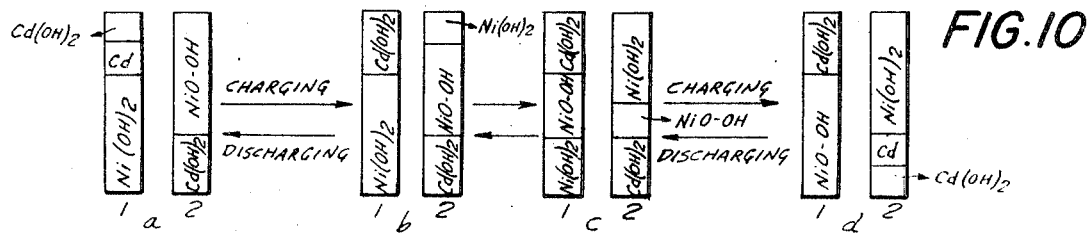
FIG. 10 is a schematic illustration of the conditions which will prevail if the active mass of the control cell contains nickel hydroxide mass as well as cadmium mass.

In other words, the charge conditions should be substantially corresponding to those illustrated in FIG. 10 wherein the system of a control cell is illustrated, similar to the showing in FIG. 2, however, with electrodes which include active masses consisting of equal proportions of cadmium or cadmium hydroxide on the one hand and nickel oxide (hydroxide) on the other hand.

If electrode 1 of a control cell including active masses as illustrated in FIG. 10 is made the anode and electrode 2 the cathode, by applying an external source of current to the cell, as indicated by the arrow "charge," first the cadmium portion "Cd" of electrode 1 will be oxidized and subsequently the nickel portion "$Ni(OH)_2$" will be oxidized to NiO—OH. Simultaneously, and in the same proportions, in the active mass of electrode 2, first the nickel oxide portion will be reduced from NiO—OH to $Ni(OH)_2$ and thereafter a partial reduction of cadmium hydroxide $Cd(OH)_2$ to Cd will take place. At $b$ and $c$ in FIG. 10 intermediate stages of this reaction are shown and the final stage at $d$. Stage $d$ is an exact reversal of the conditions in stage $a$. If now electrode 2 is made the anode and electrode 1 the cathode, the reactions will take place in reversed direction as indicated by the "discharge" arrow. The portion of cadmium and cadmium hydroxide in the electrodes 1 and 2 in condition $a$ is used for adjusting the potential during oxygen reduction at the respective cathode and also as charge reserve for avoiding hydrogen development during operation in hermetically sealed condition.

Figure 11:
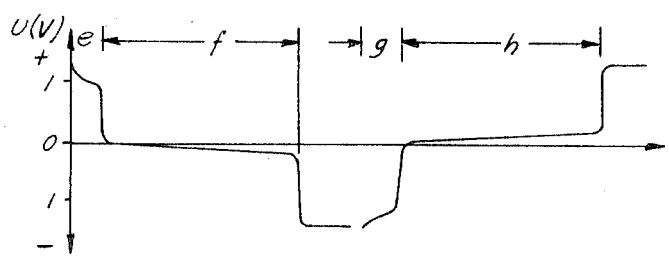
FIG. 11 graphically illustrates the voltage curve of the system shown in FIG. 10.

FIG. 11 illustrates the voltage-time curve of the system illustrated in FIG. 10. Time periods $e$ and $g$ correspond to the oxidization of the cadmium portion of electrodes 1 and 2, stage $a$ of FIG. 10, to $Cd(OH)_2$.

The potential of this stage corresponds to the potential difference of the reactions $Cd \rightarrow Cd(OH)_2$ and

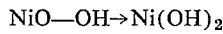
$NiO—OH \rightarrow Ni(OH)_2$

The time periods $f$ and $k$ correspond to the time requirements of the reduction of the residual NiO—OH to $Ni(OH)_2$. The potential within this range equals the potential difference of the reactions $NiO—OH \rightarrow Ni(OH)_2$ and $Ni(OH)_2 \rightarrow NiO—OH$. The rise of the potential upon completion of the polarization corresponds to the potential difference of the reactions $O_2$-development and $O_2$ reduction, since the anodically polarized electrode, after complete oxidation of the nickel hydroxide will develop oxygen, whereas simultaneously at the cathodically polarized electrode, after reduction of a portion of the cadmium hydroxide to cadmium, oxygen will be reduced.

Furthermore, it has been found that it is not absolutely necessary to equip the control cell of the present invention with two distinct spaced electrodes. For instance, it is possible to place a pellet of cadmium oxide or cadmium hydroxide with electrolyte contained in the capillaries thereof, between two metallic conductive plates or sheets and to connect two plates to a source of direct current. It will be achieved that the cadmium hydroxide adjacent the negative conductive plate will be reduced to cadmium, whereas oxygen will be developed at the positive conductive plate since cadmium hydroxide cannot be further oxidized.

Figure 13:
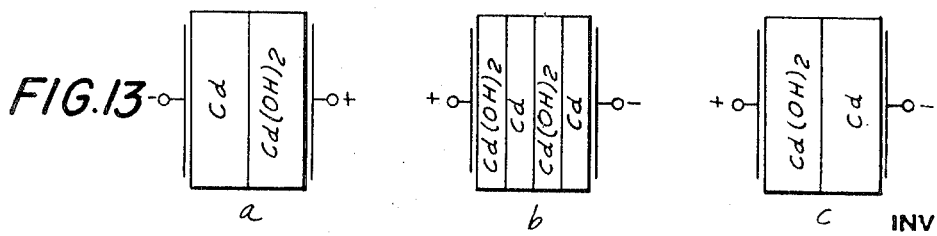
FIG. 13a–c illustrate an embodiment of the present invention according to which a single body of active mass is interposed between and in contact with two electrically conductive members which are connected to terminals of opposite polarity.

This charge condition is illustrated in FIG. 13a. If such an arrangement is installed in a hermetically sealed housing, and the charging current is then passed through the control cell in reversed direction as shown in FIG. 13b, a portion of the previously reduced cadmium adjacent to the now positive conductor will be oxidized to cadmium hydroxide, whereas at the now negative conductor an equivalent amount of cadmium hydroxide will be reduced to cadmium. This is shown in FIG. 13c. As soon as no more cadmium can be oxidized in the direction from the positive conductor, oxygen development will start at the latter.

The sudden rise in potential which occurs concurrent therewith and the corresponding reactions for passage of current in both opposite directions have been described in connection with FIGS. 2 and 3.

Such porous metal oxide bodies filled with electrolyte are particularly suitable for incorporation in small control cells since a separator is not required and a very compact arrangement can be achieved.

The control cells according to the present invention may not only be used for controlling charging and discharge time of storage batteries, but also in connection with all other arrangements which require the flow of electric current for a limited period of time.

Figure 12:
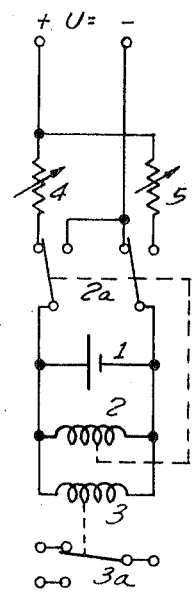
FIG. 12 illustrates another circuit arrangement utilizing the control cell of the present invention.

FIG. 12 illustrates a circuit arrangement in which one of the control cells of the present invention serves for the time control of a switching device. Control cell 2 is connected by way of adjustable resistance 4 and switching contacts 2a (with two resting positions) to a source U of direct current. As soon as the storage capacity of the control cell is exhausted, a steep voltage rise will occur as described above. Thereby, the polarizide relay 2 and associated contacts 2a are actuated and changed to the other rest position, whereby the polarity of the charging current is reversed. Simultaneously, polarized relay 3 is actuated. Contact 2a assicated to relay 3 also has two rest positions. With the help of this contact it is now possible to achieve time controlled switching of electric devices. After switching, current will flow in opposite direction through control cell 1 until the storage capacity thereof in the direction of flow of the current is exhausted whereupon the above described voltage rise and the reverse switching described above will take place. If the current strength in both directions of flow is equal, the time periods between successive switching and reversals of current flow also will be equal. Adjustable resistors 4 and 6 permit control of the current so that in each direction currents of different strength may pass through the control cell and consequently, the time periods between successive switchings may be adjusted so that switching after passage of current in one direciton may occur after a shorter or longer period than after passage of the current in the opposite direction. For instance, the time period after which switching will occur upon current flow in one direction may be 2 hours and upon current flow in the other direction 10 hours. In order to achieve this result, the ratio of current strength between the two directions of flow must be 1:5.

Since the control cells according to the present invention are hermetically sealed and current may flow therethrough in both opposite directions, it is possible to utilize the control cells as electric members of various circuits and the like, for instance as condensors, stabilizers, etc., and to incorporate these control cells in electrotechnical or electronic circuits even in locations which are only difficultly accessible.

It will be understood that each of the elements described above, or two or more together, may also find a useful application in other types of electrochemical control devices differing from the types described above.

While the invention has been illustrated and described as embodied in a control cell for use in controlling the charging and discharging of storage batteries, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A hermetically sealed electric battery comprising, in combination, a series-connected plurality of galvanic cells; and at least one hermetically sealed control cell electrically connected in series with said plurality of galvanic cells, said control cell including an aqueous electrolyte and two electrode means of substantially equal masses, chemically combinable with oxygen when in the reduced state, and wherein at the time of starting operation of the battery, the amount of reducible material in one of said electrode means is greater than the amount of oxidizable material in the other of said electrode means and wherein of the combined amount of the active masses of the two electrode means, up to 40%, measured in electrochemical equivalents, is in reduced condition, thereby ensuring that oxygen is the only gas produced in said control cell and that active mass in reduced state is present under all conditions and wherein the electrical capacity of the control cell is adjusted to that of the galvanic cells so that the rise in voltage across the terminals of the control cell when galvanic oxidation of either electrode means is complete will decrease both the charging current and the discharging current to said galvanic cells to safe values thereby substantially preventing overcharge and overdischarge of and gas evolution in said galvanic cells.

2. In an electric battery, as defined in claim 1, wherein the active masses of said hermetically sealed control cell comprise cadmium and cadmium hydroxide.

3. In an electric battery, as defined in claim 1, wherein the active masses of said hermetically sealed control cell comprise cadmium, cadmium hydroxide, nickel hydroxide with the formula $Ni(OH)_2$ and nickel oxyhydroxide with the formula $NiO(OH)$.

4. In an electric battery, as defined in claim 1, wherein said control cell comprises a gas-tight housing and means forming gas-collecting spaces defined in part by surfaces of said electrode means.

5. In an electric battery, as defined in claim 4, wherein said means for forming gas-collecting spaces comprise electrically conductive springs sandwiched between said electrode means on the one hand and opposite surfaces of said housing on the other hand.

6. A hermetically sealed electric battery comprising, in combination, a series-connected plurality of galvanic cells; an auxiliary control circuit means; and at least one hermetically sealed control cell, electrically connected by a current dividing means essentialy in parallel with said plurality of galvanic cells, said control cell including an aqueous electrolyte and two electrode means of substantially equal masses, chemically combinable with oxygen when in the reduced state, and wherein at the time of starting operation of the battery, the amount of reducible material in one of said electrode means is greater than the amount of oxidizable material in the other of said electrode means and wherein of the combined amount of the active masses of the two electrode means, up to 40%, measured in electro-chemical equivalents, is in reduced condition, thereby ensuring that oxygen is the only gas produced in said control cell and that active mass in reduced state is present under all conditions and wherein the electrical capacity of the control cell is adjusted to that of the galvanic cells so that the rise in voltage across the terminals of the control cell when galvanic oxidation of either electrode means is complete will decrease by auxiliary control circuit means both the charging current and the discharging current to said galvanic cells to safe values thereby substantially preventing overcharge and overdischarge of and gas evolution in said galvanic cells.

7. In an electric battery, as defined in claim 6, wherein the active masses of said hermetically sealed control cell comprise cadmium and cadmium hydroxide.

8. In an electric battery, as defined in claim 6, wherein the active masses of said hermetically sealed control cell comprise cadmium, cadmium hydroxide, nickel hydroxide with the formula $Ni(OH)_2$ and nickel oxy-hydroxide with the formula $NiO(OH)$.

9. In an electric battery, as defined in claim 6, wherein said control cell comprises a gas-tight housing and means forming gas-collecting spaces defined in part by surfaces of said electrode means.

10. In an electric battery, as defined in claim 9, wherein means for forming gas-collecting spaces comprise electrically conductive springs sandwiched between said electrode means on the one hand and opposite surfaces of said housing on the other hand.

References Cited

UNITED STATES PATENTS

| | | | |
|---|---|---|---|
| 2,934,581 | 4/1960 | Dassler | 136—9 |
| 2,988,590 | 6/1961 | Andre | 136—182 |
| 2,994,730 | 8/1961 | Freas | 136—100 |
| 3,023,258 | 2/1962 | Peters | 136—6 |
| 3,057,942 | 10/1962 | Smith et al. | 136—6 |
| 3,089,913 | 5/1963 | Garten et al. | 136—6 |
| 3,170,819 | 2/1965 | Abramson | 136—6 |
| 3,174,879 | 3/1965 | Stanimirovitch | 136—6 |
| 3,302,091 | 1/1967 | Henderson | 136—182X |

WINSTON A. DOUGLAS, Primary Examiner

A. SKAPARS, Assistant Examiner

U.S. Cl. X.R.

136—24, 28